United States Patent
Luo et al.

(10) Patent No.: US 9,466,215 B2
(45) Date of Patent: Oct. 11, 2016

(54) MULTI-SURFACE MODEL-BASED TRACKING

(71) Applicant: Robert Bosch GmbH, Stuttgart (DE)

(72) Inventors: Yun Luo, Ann Arbor, MI (US); Xavier Zhu, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/850,829

(22) Filed: Mar. 26, 2013

(65) Prior Publication Data

US 2013/0253796 A1    Sep. 26, 2013

Related U.S. Application Data

(60) Provisional application No. 61/615,596, filed on Mar. 26, 2012.

(51) Int. Cl.
*G08G 1/16* (2006.01)
*B60K 31/00* (2006.01)
(Continued)

(52) U.S. Cl.
CPC ........... *G08G 1/166* (2013.01); *B60K 31/0008* (2013.01); *G01S 11/12* (2013.01); *G01S 13/867* (2013.01); *G01S 15/931* (2013.01); *G01S 2013/9375* (2013.01); *G01S 2013/9378* (2013.01)

(58) Field of Classification Search
CPC ........... G06K 9/00; G06G 7/48; G08G 1/09; G08G 1/166; B60K 31/08; G01S 15/931; G01S 2013/9378; G01S 13/867; G01S 11/12; G01S 2013/9375
USPC .......................................................... 701/96
See application file for complete search history.

(56) References Cited

U.S. PATENT DOCUMENTS 5,410,346 A  *  4/1995  Saneyoshi et al. ........... 348/116
5,845,048 A       12/1998  Masumoto
(Continued)

FOREIGN PATENT DOCUMENTS

CN  102303605 A   1/2012
EP  1462762       9/2004
EP  2107503      10/2009

OTHER PUBLICATIONS

Llorca et al. "Vision-Based Traffic Data Collection Sensor for Automotive Applications," Sensors, 2010, 10, ISSN 1424-8220, Jan. 22, 2010, pp. 860-875.*

(Continued)

*Primary Examiner* — Fadey Jabr
*Assistant Examiner* — Courtney Heinle
(74) *Attorney, Agent, or Firm* — Michael Best & Friedrich LLP

(57) ABSTRACT

Systems and methods for detecting a vehicle. One system includes a controller. The controller is configured to receive images from a camera mounted on a first vehicle, identify a surface of a second vehicle located around the first vehicle based on the images, and generate a three-dimensional model associated with the second vehicle. The model includes a first plane and a second plane approximately perpendicular to the first plane. The first plane of the model is associated with the identified surface of the second vehicle. The controller is further configured to track a position of the second vehicle using the three-dimensional model after the identified surface falls at least partially outside of a field-of-view of the at least one camera.

18 Claims, 7 Drawing Sheets

(51) Int. Cl.
*G01S 11/12* (2006.01)
*G01S 15/93* (2006.01)
*G01S 13/86* (2006.01)
*G01S 13/93* (2006.01)

(56) References Cited

U.S. PATENT DOCUMENTS

| | | | |
|---|---|---|---|
| 5,892,855 A * | 4/1999 | Kakinami et al. | 382/291 |
| 6,246,412 B1 * | 6/2001 | Shum et al. | 345/419 |
| 6,873,251 B2 * | 3/2005 | Schiffmann et al. | 340/436 |
| 6,989,754 B2 * | 1/2006 | Kisacanin et al. | 340/576 |
| 7,161,616 B1 * | 1/2007 | Okamoto et al. | 348/148 |
| 7,307,655 B1 * | 12/2007 | Okamoto et al. | 348/222.1 |
| 7,518,490 B2 | 4/2009 | Takenaga et al. | |
| 7,764,808 B2 | 7/2010 | Zhu et al. | |
| 7,782,179 B2 * | 8/2010 | Machii et al. | 340/435 |
| 7,929,728 B2 * | 4/2011 | Guo et al. | 382/103 |
| 7,957,559 B2 | 6/2011 | Shima et al. | |
| 8,041,079 B2 * | 10/2011 | Chiu et al. | 382/104 |
| 8,077,965 B2 * | 12/2011 | Kakinami et al. | 382/154 |
| 8,098,889 B2 * | 1/2012 | Zhu et al. | 382/103 |
| 8,108,119 B2 * | 1/2012 | Southall et al. | 701/96 |
| 8,212,812 B2 * | 7/2012 | Tsin et al. | 345/420 |
| 8,233,660 B2 * | 7/2012 | Fritsch et al. | 382/103 |
| 8,319,618 B2 * | 11/2012 | Gomi et al. | 340/435 |
| 8,352,075 B2 * | 1/2013 | Cho et al. | 700/259 |
| 8,355,539 B2 * | 1/2013 | Tan et al. | 382/104 |
| 8,379,924 B2 * | 2/2013 | Schaufler | 382/104 |
| 8,521,418 B2 * | 8/2013 | Ma et al. | 701/408 |
| 8,543,277 B2 * | 9/2013 | Higgins-Luthman | 701/28 |
| 8,559,675 B2 * | 10/2013 | Nogami et al. | 382/106 |
| 8,564,657 B2 * | 10/2013 | Michalke et al. | 348/118 |
| 8,665,079 B2 * | 3/2014 | Pawlicki et al. | 340/435 |
| 8,744,744 B2 * | 6/2014 | Takagi | 701/301 |
| 2002/0134151 A1 | 9/2002 | Naruoka et al. | |
| 2002/0167589 A1 * | 11/2002 | Schofield et al. | 348/148 |
| 2003/0021490 A1 * | 1/2003 | Okamoto et al. | 382/284 |
| 2003/0085999 A1 * | 5/2003 | Okamoto et al. | 348/148 |
| 2004/0234136 A1 * | 11/2004 | Zhu et al. | 382/224 |
| 2006/0204035 A1 * | 9/2006 | Guo et al. | 382/103 |
| 2007/0041659 A1 * | 2/2007 | Nobori et al. | 382/284 |
| 2008/0273752 A1 * | 11/2008 | Zhu et al. | 382/103 |
| 2008/0294401 A1 * | 11/2008 | Tsin et al. | 703/8 |
| 2009/0060273 A1 * | 3/2009 | Stephan et al. | 382/103 |
| 2009/0303234 A1 | 12/2009 | Becker | |
| 2010/0085238 A1 | 4/2010 | Muller-Frahm et al. | |
| 2011/0175752 A1 * | 7/2011 | Augst | 340/905 |
| 2012/0069153 A1 * | 3/2012 | Mochizuki et al. | 348/47 |
| 2012/0140074 A1 * | 6/2012 | Taguchi et al. | 348/148 |

OTHER PUBLICATIONS

Jing Xiao, Simon Baker, Iain Matthews, and Takeo Kanade, "Real-Time Combined 2D+3D Active Appearance Models", The Robotics Institute, Carnegie Mellon University, Pittsburgh, PA 15213, Mar. 2004.*

PCT/US2013/033869 International Search Report and Written Opinion dated Jul. 17, 2013 (10 pages).

Liu, J. et al., "A fast identification method of vehicle longitudinal dynamic parameters for intelligent cruise control," Transactions of the Chinese Society of Agricultural Machinery, Oct. 2010, vol. 41, No. 10, pp. 6-10, with English Translation.

Lee, C. et al., "Object recognition algorithm for adaptive cruise control of vehicles using laser scanning sensor," 2000 IEEE Intelligent Transportation Systems, Proceedings (Cat. No. 00TH8493), 2000, pp. 305-310.

* cited by examiner

MULTI-SURFACE MODEL-BASED TRACKING

RELATED APPLICATIONS

The present application claims priority to U.S. Provisional Patent Application No. 61/615,596, filed Mar. 26, 2012, the entire content of which is herein incorporated by reference.

BACKGROUND

Existing adaptive cruise control ("ACC") and forward collision warning ("FCW") systems provide radar sensor solutions optionally supplemented by a forward-looking monochrome camera. Radar sensors work well for longitudinal distance and velocity measurements but may not be able to detect certain traffic situations that rely on precise and robust lateral tracking. For example, existing radar systems often cannot detect neighboring lane disturbances that can occur when a vehicle is overtaking other vehicle, such as semi-trucks, at low relative speeds. In particular, radar systems may see sporadic reflections in the driving neighboring lane due to the mass of the truck side and may not be able to maintain tracking of previously-seen vehicles. Existing radar systems also may not be able to provide proper reactions when a target vehicle in the same lane slows and turns sharply into another street (often referred to as "McDonald's turns"). For example, existing radar systems may unnecessarily decelerate the vehicle or provide warnings in this situation. Furthermore, many existing radar systems cannot properly detect "late" vehicles, such as when a vehicle abruptly cuts into a lane.

These situations may be mitigated to a certain degree by a camera that can provide information on lane position and vehicle detection. However, existing monochrome cameras need to see most of or the entire backside of a vehicle to detect the vehicle and can only track the vehicle when a majority of the vehicle back-side is within the camera's field of view ("FoV"). As a result, cameras are not able to fully eliminate all the above errors, especially for cut-in situations.

SUMMARY

Therefore, embodiments of the present invention provide a more universal approach for cameras to enhance current ACC or FCW systems based on radar, camera, or a combination thereof and provide robust tracking and recognition of vehicles. As described below, embodiments of the present invention can detect an accurate lateral position of a vehicle (e.g., either in neighbor lane or the same lane) without seeing the entire vehicle and can detect the vehicle's turning intention by detecting rotation of the vehicle earlier than existing systems.

In particular, embodiments of the present invention provide systems and methods for extending the capability of a forward-looking camera. In particular, the proposed systems and methods perform feature tracking across vehicle surfaces based on a complete three-dimensional ("3-D") model of the vehicle using two-dimensional ("2-D") data captured by the camera. The 3-D model is used to track a side of a vehicle even though the back of the vehicle, which was originally detected by the camera, moves out of the camera's FoV. Therefore, the 3-D model remedies the situations discussed above. The 3-D model can also provide additional functionality, such as being a basis for building a full 360-degree surround model using multiple cameras.

For example, one embodiment of the invention provides a system for detecting a vehicle. The system includes a controller. The controller is configured to receive images from a camera mounted on a first vehicle, identify a surface of a second vehicle located around the first vehicle based on the images, and generate a three-dimensional model associated with the second vehicle. The model includes a first plane and a second plane approximately perpendicular to the first plane. The first plane is associated with the identified surface of the second vehicle. The controller is further configured to track a position of the second vehicle using the three-dimensional model after the identified surface falls at least partially outside of a field-of-view of the at least one camera.

Another embodiment of the invention provides a method for detecting a vehicle. The method includes receiving, at at least one controller, images from at least one camera mounted on a first vehicle, detecting, by the at least one controller, a surface of a second vehicle located around the first vehicle based on the images, and generating, by the at least one controller, a three-dimensional model representing the second vehicle. The three-dimensional model includes a first plane and a second plane approximately perpendicular to the first plane, and the first plane represents the identified surface of the second vehicle. The method also includes determining, by the at least one controller, a position of the second vehicle using the model and updated data from the at least one camera after the identified surface of the second vehicle falls at least partially outside of a field-of-view of the at least one camera.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
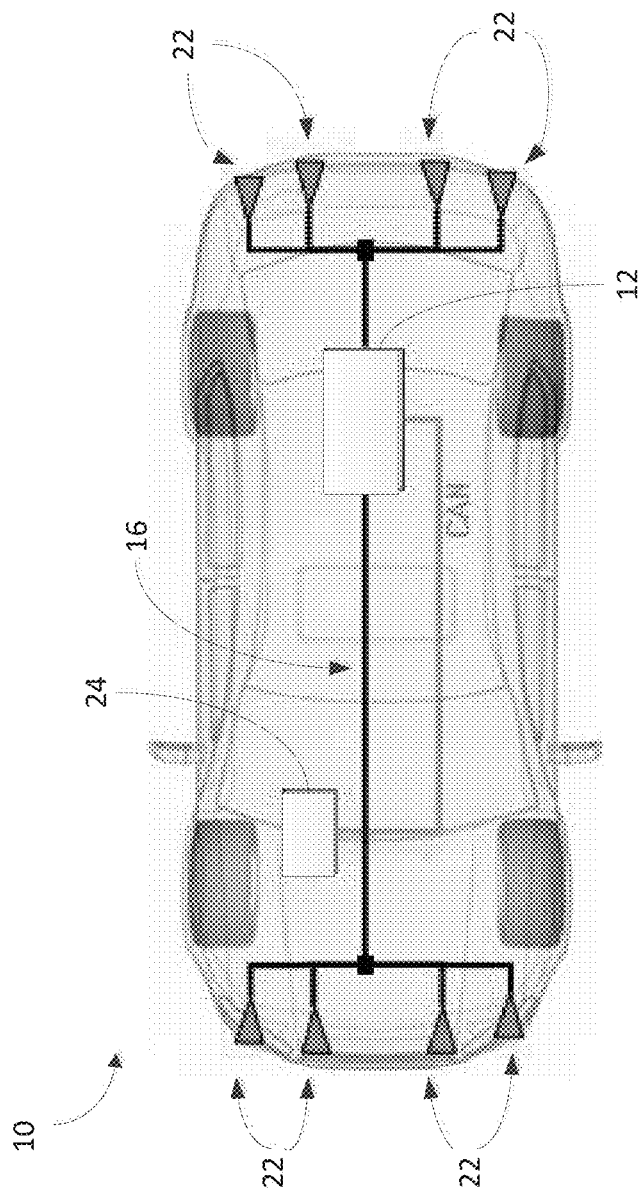
FIG. 1 schematically illustrates a vehicle.

FIG. 1 illustrates a vehicle 10. The vehicle 10 includes an object detection controller 12. The object detection controller 12 is connected to a network, such as a controller area network ("CAN") bus 16. The bus 16 allows the controller 12 to exchange data with devices connected to the bus 16, such as one or more environment sensors 22. Although the bus 16 is shown in the vehicle 10 as connecting the various components, other connections between the components, whether wired, wireless, direct, or indirect, are possible.

The environment sensors 22 include one or more radar, sonar, ultrasonic, and/or optical sensors (e.g., one or more monochrome cameras, stereo cameras, etc.) that are mounted on the surface of the vehicle 10 and detect objects located around the vehicle 10 (e.g., other vehicles). As illustrated in FIG. 1, the sensors 22 can be positioned at the front and rear of the vehicle 10 to detect objects located generally in front of and behind the vehicle 10. However, it should be understood that the sensors 22 can be mounted at any location on the vehicle 10 to detect objects in any direction. The object detection controller 12 obtains data from the environment sensors 22 and uses the data to detect objects located around the vehicle 10 and their relative positions. For example, one of the sensors 22 detects a distance between the vehicle 10 and an object located around the vehicle 10. In one embodiment, one of the sensors 22 includes a radar sensor that transmits radar waves. The waves bounce off the objects closest to the vehicle 10 and return to the radar sensor. The radar sensor (or the object detection controller 12) calculates how long it took for a wave to bounce back after transmission. With this information, the radar sensor (or the object detection controller 12) determines the distance between the vehicle 10 and objects (e.g., other vehicles) located around the vehicle 10. The environment sensors 22 can also include a camera (e.g., a monocular or a binocular (stereo vision) monochrome camera system) mounted at the front of the vehicle 10. The camera captures images (e.g., still or video) of an area in front of the vehicle 10.

The controller 12 uses the information collected by the sensors 22 to identify or detect other objects, such as other vehicles, located around the vehicle 10. In some embodiments, the controller 12 uses information regarding detected objects (e.g., position, speed, change in position, etc.) to perform various automatic vehicle control operations, such as adaptive cruise control ("ACC") and/or forward collision warning ("FCW"). In other embodiments, however, the controller 12 is configured to detect objects and provide information regarding detected objects to one or more supplemental controllers 24 (e.g., an ACC controller, an FCW controller, a stability control system, etc.), and the supplemental controller 24 can be configured to use the information regarding detected objects to automatically modify vehicle operation. Accordingly, it should be understood that the functionality of the controller 12 can be distributed among multiple control devices or systems.

Figure 2:
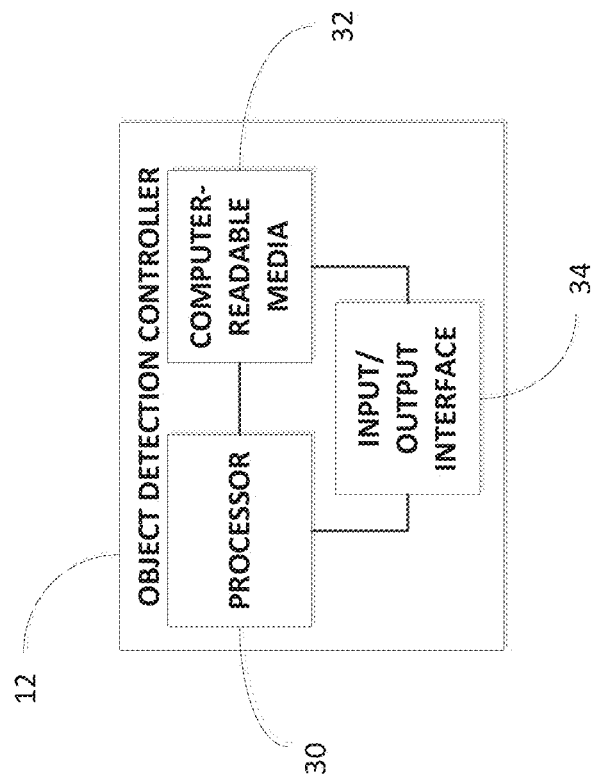
FIG. 2 schematically illustrates an object detection controller included in the vehicle of FIG. 1.

As illustrated in FIG. 2, the object detection controller 12 includes a processor 30, non-transitory computer-readable media 32, and an input/output interface 34. The computer-readable media 32 can include random access memory ("RAM") and/or read-only memory ("ROM"). The input/output interface 34 transmits and receives information over the bus 16 and, optionally, other devices not connected to the bus 16 (e.g., inside the vehicle 10 or external to the vehicle 10). The processor 30 receives information (e.g., from the media 32 and/or the input/output interface 34) and processes the information by executing one or more instructions or modules. The instructions or modules are stored in the computer-readable media 32. The processor 30 also stores information (e.g., information received from the bus 16 or information generated by instructions or modules executed by the processor 30) to the media 32. It should be understood that although only a single processor, input/output interface, and computer-readable media module are illustrated in FIG. 2, the object detection controller 12 can include multiple processing units, memory modules, and/or input/output interfaces. It should be understood that in other embodiments, the controller 12 includes an application-specific integrated circuit ("ASIC") in place of or in addition to the processor 30, media 32, and interface 34.

The instructions stored in the computer-readable media 32 provide particular functionality when executed by the processor 30. In general, the instructions, when executed by the processor 30, use information from the environment sensors 22 to detect objects, such as other vehicles around the vehicle 10 and their position relative to the vehicle 10. As noted above, the controller 12 can be configured to use information regarding detected objects to perform various vehicle control operations (e.g., ACC and/or FCW) or can be configured to provide this information to other controllers that perform these operations.

As described above in the summary section, although using cameras with radar systems can improve detection and tracking of surrounding objects and vehicles, existing camera systems for detecting surrounding vehicles detect vehicles based on the appearance of the back of a vehicle and usually require that the camera sees nearly 100% of the back (e.g., to identify a surface of having a particular, size, shape, and/or other features, such as a generally rectangular surface of a predetermined size). Accordingly, existing cameras are not able to recognize a vehicle by seeing only the side of the vehicle. Therefore, existing cameras usually lose track of a vehicle when part of the back of the vehicle moves out of the camera's field-of-view ("FoV") due to a perspective change (e.g., when the vehicle 10 overtakes the vehicle) or due to vehicle rotation (e.g., the detected vehicle or the vehicle 10 turns or changes lanes).

To overcome these issues, the controller 12 is configured to detect objects (i.e., other vehicles) using a multi-surface model, including a two-surface model, to represent a detected vehicle. The two surfaces include the back of the object and a side of the object. Depending on the relative object position, the side surface could be the left or the right side. However, the topology matches what a camera located at the front of the vehicle 10 sees (e.g., whether images detected by the camera include features of a surface to the left or right of a back of a detected vehicle).

Figure 3:
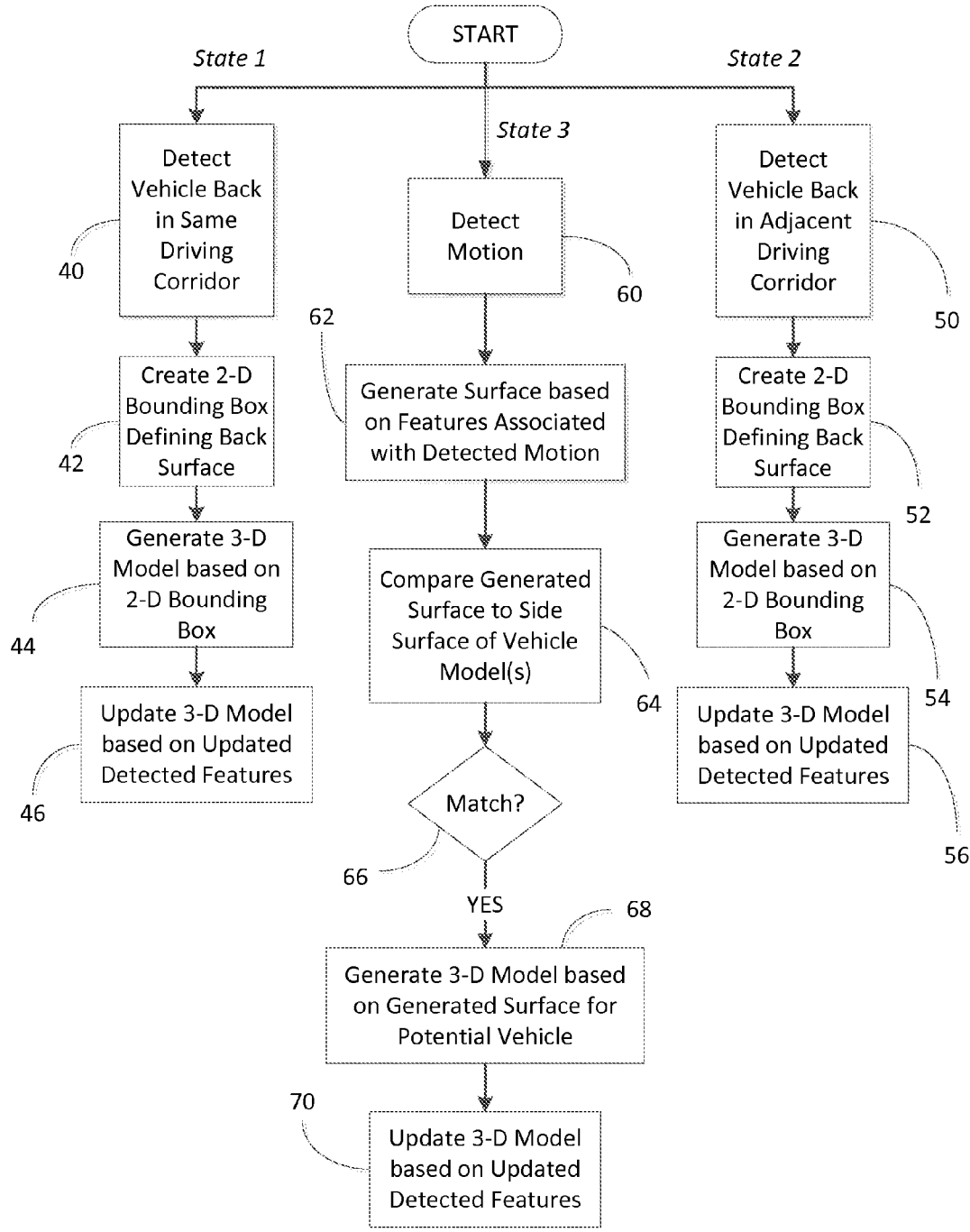
FIG. 3 is a flowchart illustrating object detection methods performed by the object detection controller of FIG. 2.

For example, FIG. 3 is a flow chart illustrating object detection and tracking performed by the controller 12 (e.g., based on instructions stored in the media 32 and executed by the processor 30). In some embodiments, the controller 12 is configured to detect a vehicle in three different situations. In particular, the controller 12 can be configured to (1) detect a back of a vehicle in the same driving lane or corridor as the vehicle 10 ("State 1"), (2) detect a back of a vehicle in an adjacent driving corridor as the vehicle 10 ("State 2"), and (3) detect a side of a vehicle ("State 3"). As described in more detail below, the controller 12 can detect a side of a vehicle either initially or after initially detecting the back of the vehicle. The controller 12 is configured to track the detected vehicle as it transitions between the three situations with little, if any, interruption in tracking (so-called "seamless" tracking) In particular, the controller 12 tracks a detected vehicle one state to another without losing track of the vehicle or mischaracterizing a detected vehicle as a new vehicle rather than a previously-detected vehicle that has changed position.

In particular, as illustrated in FIG. 3, in State 1, the controller 12 uses a manner similar to existing systems to identify the backside of a vehicle based on data from the environment sensors 22 (e.g., images from a camera) (at 40). After identifying the back of a vehicle, the controller 12 performs vehicle classification (e.g., "car," "truck," or "motorcycle"). The controller 12 then creates a two-dimensional ("2-D") bounding box representing the identified back of the vehicle (at 42). The size of the bounding box can be set based on the vehicle classification.

The controller 12 also generates a three-dimensional ("3-D") model associated with the identified vehicle (at 44). The model includes multiple surfaces of the identified vehicle. In particular, the model includes a first plane and a second plane approximately perpendicular to the first plane. The first plane can be associated with a back surface of a detected vehicle, and the second plane can be associated with a side surface of the detected vehicle. Depending on the position of the detected vehicle to the vehicle 10 (i.e., whether the detected vehicle is to the left, front, or right of the vehicle 10), the side surface is either a left side surface or a right side surface of the detected vehicle. Each plane of the model represents a hypothetical surface of the identified vehicle.

As the sensors 22 continuously acquire new data (e.g., new images), the controller 12 tracks features within the bounding box and within a predetermined zone of plausibility on either side of the bounding box. If the controller 12 identifies features that are outside of the bounding box but associated with a side of the detected vehicle (i.e., outside the bounding box but inside the zone of plausibility and/or inside the model), the controller 12 updates the model based on the detected side of the vehicle (at 46). Accordingly, the resulting updated model provides a more accurate estimation of the detected vehicle's rotation and lateral position. This information can be used by the controller 12 and/or other control devices and systems to perform various automatic vehicle operations, such as adjusting a cruise control speed of the vehicle 10 to prevent a collision with a vehicle in the same driving corridor, issuing a warning or slowing the vehicle 10 to prevent a collision with a detected vehicle, etc.

From State 1, a detected vehicle may transition to State 2, such as when the detected vehicle or the vehicle 10 moves laterally and enters an adjacent driving corridor. Similarly, from State 1, a detected vehicle may transition to State 3, such as when the detected vehicle or the vehicle 10 turns (e.g., sharply, such as a McDonald's turn) and the back of the detected vehicle is no longer visible. Accordingly, using the model, the controller 12 can seamlessly track a detected vehicle during these transactions. In particular, the controller 12 can use a vehicle side represented by the model to track the detected vehicle even if the back of the detected vehicle is no longer visible or within the sensor's FoV.

In State 2, the controller 12 detects the back of a vehicle in an adjacent driving corridor (at 50) and creates a 2-D bounding box (at 52) as described above for State 1. The controller 12 then generates a 3-D model based on the 2-D bounding box (at 54) and updates the model based on new or updated data acquired from the environment sensors 22 (at 56), as also described above for State 1.

From State 2, a detected vehicle may transition to State 1, such as when the detected vehicle changes lanes. Similarly, from State 2, a detected vehicle may transition to State 3, such as when the vehicle 10 overtakes the detected vehicle. In both these transitions, the controller 12 can continue to track the vehicle using the model. In particular, in a cut-in situation (e.g., where a vertical distance between the detected vehicle and vehicle 10 is small), the side of the detected vehicle may remain visible even if the back of the vehicle (partially or wholly) is no longer within the sensors' FoV. Similarly, during a passing situation, even if the back of the detected vehicle is no longer visible, the controller 12 uses the side surface represented by the model to continue tracking the position of the vehicle. Continuous tracking of the detected vehicle in these situations provides for better estimation of lateral distance and velocity of the detected vehicle, which helps ACC and FCW systems of the vehicle 10.

As illustrated in FIG. 3, in State 3, the controller 12 does not detect a back of a vehicle as performed in States 1 and 2. However, in State 3, the controller 12 detects a side of a vehicle. For example, if the side of a vehicle is seen first by the sensors 22, such as when another vehicle is overtaking the vehicle 10 or merges into the same or a neighboring corridor as the vehicle 10, the controller 12 uses optical flow and object or motion segmentation to detect motion based on data from the environment sensors 22 (e.g., based on images from a camera) that is not part of the background (at 60). After detecting the motion, the controller 12 extracts features from the data associated with the motion. The controller 12 then uses a surface fitting algorithm to generate a surface based on the extracted features (at 62). The controller 12 compares the generated surface to an estimated side surface of one or more potential vehicle models having a predetermined motion profile (e.g., matching detected motion) (at 64). If the generated surface matches the estimated surface(s) (at 66), the controller 12 identifies the extracted features as being associated with a potential vehicle and generates a model for potential vehicle (at 68). Accordingly, using the model, the controller 12 can continue to track the potential vehicle and can update the model accordingly (at 70) as described above with respect to States 1 and 2. It should be understood that the controller 12 can be configured to detect the side of a vehicle as part of initially detecting a vehicle or can perform the detection as part of tracking a vehicle after initially identifying the back of the vehicle.

From State 3, a detected vehicle can transition to State 2. This transition can occur when there is a vehicle in an adjacent corridor that is passing the vehicle 10 and gradually the back of the vehicle moves into the sensors' FoV. During this transition, the controller 12 tracks the side of the vehicle. When the back of the vehicle begins to move into the sensors' FoV, the controller 12 detects features that do not fall in the estimated plane associated with the vehicle side but fall in the estimated plane for the vehicle back as represented by the model. Accordingly, using the 3-D models, the controller 12 can properly track a detected vehicle and estimate the lateral and longitudinal distance of the detected vehicle. This information can be used by various automatic vehicle control operations, such as ACC and FCW systems. It is also possible for a detected vehicle to transition from State 3 to State 1. For example, this situation may occur when the driving corridor is wide or the sensors 22 have a narrow field of view.

Figure 4:
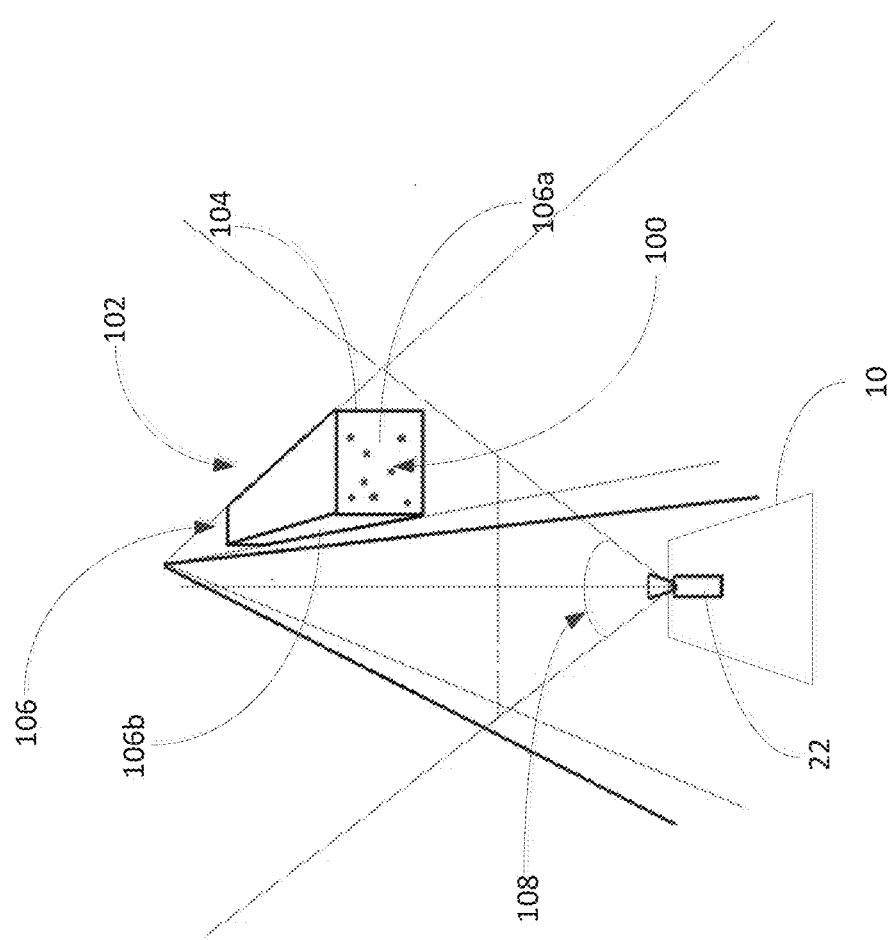
FIGS. 4-7 schematically illustrate vehicle detection and tracking performed by the object detection controller of FIG. 2.

Accordingly, as described above, using the three-dimensional models, the controller 12 can accurately detect and track the position of vehicles located around the vehicle 10 (e.g., a distance between a detected vehicle and the vehicle 10). In particular, the controller 12 can identify a vehicle either by identifying a back of the vehicle or by identifying a side of the vehicle. Furthermore, after initially identifying or recognizing a vehicle based on a particular surface of the vehicle (e.g., back or side), the controller 12 uses the 3-D model to track the vehicle even after the surface of the vehicle that was initially detected falls outside of the sensors' FoV. In particular, as illustrated in FIG. 4 and as described above, the controller 12 can identify a back 100 of a vehicle 102 based on features extracted from data from the sensors 22 (i.e., images). After identifying the back 100 of the vehicle 102, the controller 12 defines a bounding box 104 that forms the basis for a three-dimensional model 106 associated with the detected vehicle 102. As illustrated in FIG. 4, the model 106 includes at least a first plane 106a and a second plane 106b approximately perpendicular to the first plane 106a. The first plane 106a can represent the back 100 of the vehicle 102 and the second plane 106b can represent a side of the vehicle 102.

Figure 5:
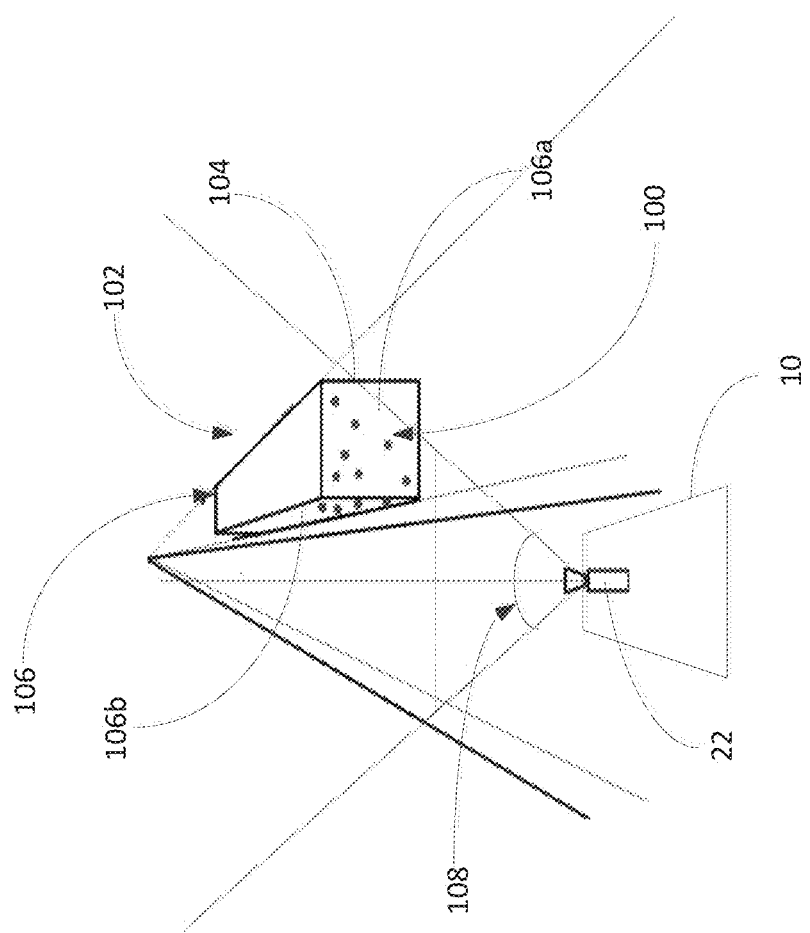
Figure 6:
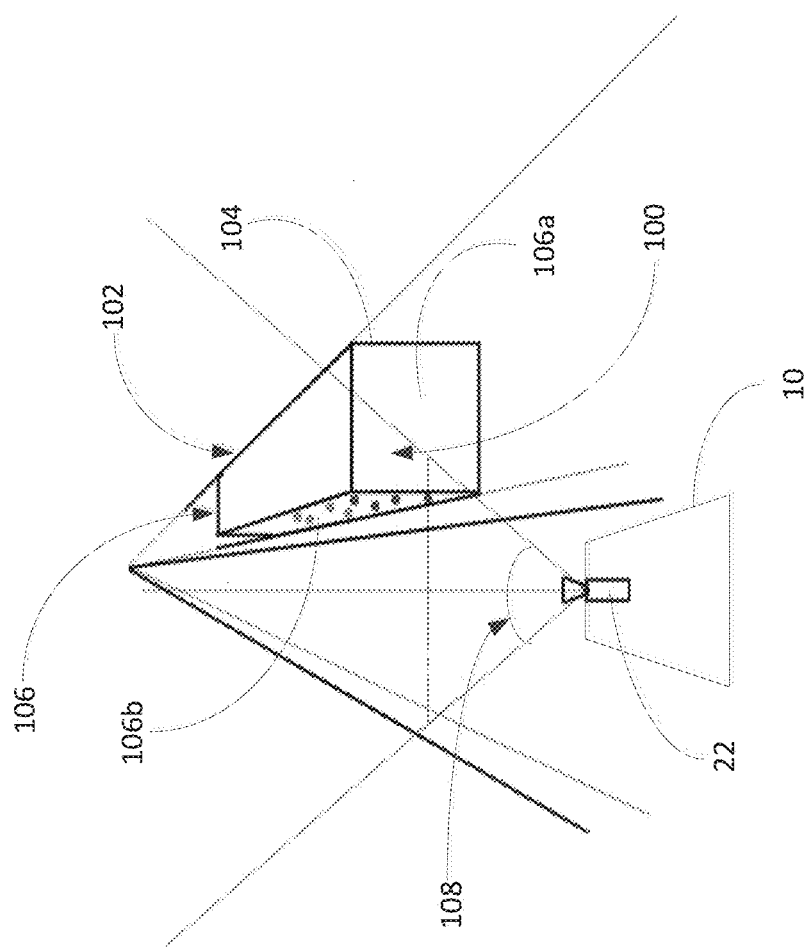
Figure 7:
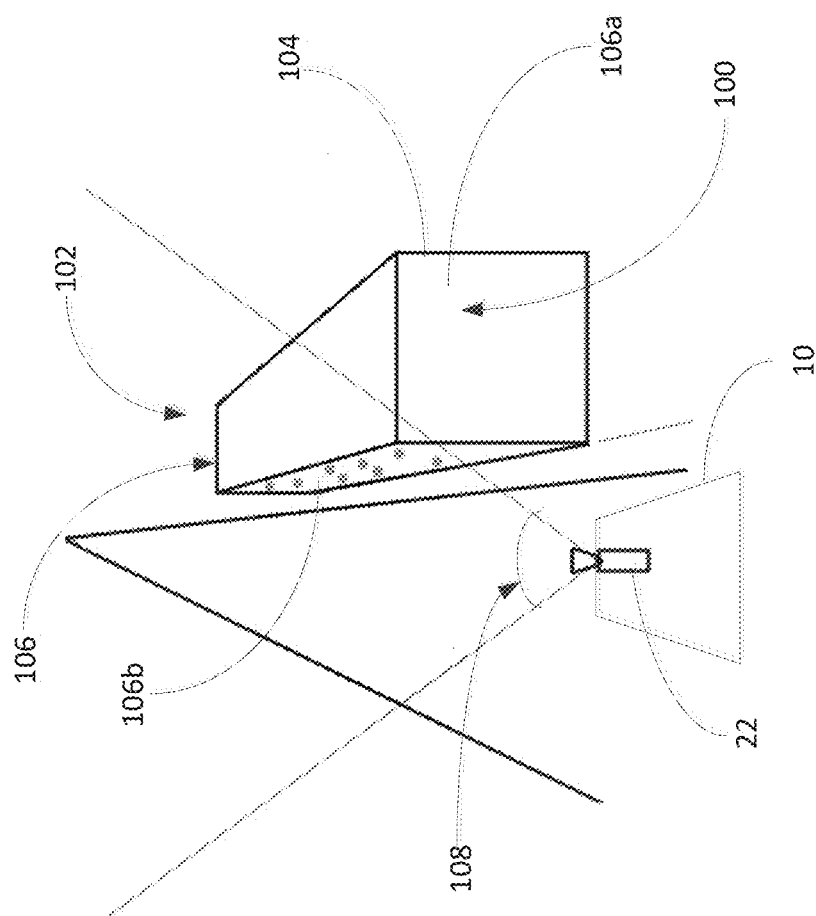

As illustrated in FIGS. 5-7, after initially identifying the vehicle 102, the controller 12 uses the model 106 to track the vehicle 102 as it moves and even after the back 100 of the vehicle 102 has fallen (partially or completely) outside of the sensors' FoV 108. In particular, the controller 12 identifies features of the vehicle 102 based on data from the environment sensors 22. The controller 12 determines if the detected features match the model 106 previously generated for the identified vehicle 102. If the features match the model 106, the controller 12 continues to track the identified vehicle 102. Therefore, even in situations where the entire back 100 of the vehicle 102 is outside of the sensors' FoV 108, which may occur when the vehicle 102 changes lanes, turns, or changes speed, the controller 12 uses the model 106 to continue to track the vehicle 102.

Once a vehicle model is constructed using available features, the controller 12 acquires new or updated data from the sensors 22, tracks features that fit into the model, and updates the model accordingly based on the updated data. This ability allows the controller 12 to detect particular traffic situations that many existing object detection systems cannot properly detect. For example, the controller 12 uses a "rolling feature" to determine if new features identified in updated data from the sensors 22 belong to the same originally-detected surface or a new surface that could fit the generated 3-D multi-surface model. In particular, the controller 12 can be configured to determine if the new features fit the plane of the model representing the initial surface identified by the controller 12. If the features fit this plane, the controller 12 identifies that the new features are associated with the initial surface identified by the controller 12 and the controller 12 can update the model accordingly (e.g., by adjusting the model's size, position, etc.). If the new features do not fit this plane, the controller 12 determines if the new features fit a "next" plane in the model. The next plane can be associated with the next surface that will likely be seen by the sensors 22. For example, if the sensors 22 initially viewed the back surface of a vehicle, the next surface likely viewed by the sensors 22 would be a side surface. Similarly, if the sensors 22 initially viewed a side surface of a vehicle, the next surface likely viewed by the sensors 22 would be the back surface. Accordingly, the controller 12 identifies the "next" plane from the model and determines if the new features fit this plane. If so, the controller 12 identifies that the new features are associated with the "next" plane and updates the model accordingly (e.g., by adjusting the model's size, position, orientation, etc.). If new features do not fit any of the planes associated with the model of a previously-identified vehicle, the controller 12 can be configured to generate a new model and/or delete an existing model (i.e., indicating that a previously-identified vehicle is no longer present). Therefore, the controller 12 "rolls" from one plane or surface to the logical next plane or surface to determine if new features extracted from updated data provided by the sensors 22 continue to represent a previously-identified vehicle.

By "rolling" features from the back surface to a side surface and following features along a side, or vice versa, the controller 12 can accurately track a vehicle during a passing situation. Similarly, for a two-camera system (i.e., including a front-view camera and a back-view camera) or a 360 degree FoV system, the controller 12 can continue rolling features to a front surface. Accordingly, as long as the controller 12 identifies features that fit a model (e.g., fall within the model or within a zone of plausibility associated one or more of the planes of the model or the model itself using the above rolling feature), the controller 12 can continue to track the detected vehicle even when the original surface used to initially detect the vehicle have completely disappeared from the sensors' FoV.

In addition to accurately tracking passing situations, the controller 12 can also accurately track detected vehicles during sharp turning situations, such as McDonald's turns. In particular, the controller 12 can identify rotation or turning of a detected vehicle earlier by detecting rotation of features along the 3-D multi-surface model (e.g., detecting change in features of a vehicle's side). Furthermore, during a cut-in situation or a merge situation, the controller 12 detects a side of a vehicle, which allows the cutting-in or merging vehicle to be detected earlier than existing systems.

Therefore, embodiments of the present invention provide systems and method for detecting and tracking other vehicles located around a vehicle using three-dimensional, multi-surface models, and the information gathered using this process can be used to enhance automatic vehicle control operations, such as ACC and FCW. It should be understood that the forward-looking system described herein can also be mirrored backward or can be used to provide approximately 360-degree FoV coverage. For example, with approximately 360 degrees of coverage, the controller 12 can track a passing vehicle based on a rear-view camera initially seeing the front and the side of the vehicle and a side-view camera subsequently seeing the side of the vehicle and, in some embodiments, can predict a potential cut-in situation even before the passing vehicle is seen by a front-view camera.

It should be understood that although the system and methods described herein relate to detecting and tracking vehicles, the systems and methods can be used to detect and track any type of object located around the vehicle.

Various features and advantages of the invention are set forth in the following claims.

What is claimed is:

1. A vehicle mounted system for detecting a vehicle, the system comprising:
 a controller including a processor, a computer readable media in communication with the processor, and an input/output interface, the processor configured to:
  receive images from a camera mounted on a moving first vehicle,
  identify a surface of a second vehicle located around the first vehicle based on the images by: detecting motion in the images,
   extracting features from the images based on the detected motion,
   generating a surface based on the extracted features, and
   comparing the surface to a side surface of at least one vehicle model;
  generate a three-dimensional model associated with the second vehicle, the three-dimensional model including a first plane and a second plane approximately perpendicular to the first plane, wherein the first plane is associated with the identified surface of the second vehicle, and track a position of the second vehicle using the three-dimensional model after the identified surface falls at least partially outside of a field-of-view of the camera by:
receiving updated images from the camera,
extracting features from the updated images,
determining if the extracted features fit the first plane of the three-dimensional model,
when the extracted features do not fit the first plane of the three-dimensional model, determining if the extracted features fit the second plane of the three-dimensional model, and
when the extracted features fit the second plane of the three-dimensional model, updating the three-dimensional model based on the extracted features, and
wherein the controller is further configured to perform at least one automatic vehicle control operation based on the tracked position of the second vehicle.

2. The system of claim 1, wherein the controller is further configured to receive data from at least one radar sensor mounted on the first vehicle.

3. The system of claim 1, wherein the surface of the second vehicle is a back surface of the second vehicle.

4. The system of claim 1, wherein the surface of the second vehicle is a side surface of the second vehicle.

5. The system of claim 1, wherein the controller is configured to identify the surface of the second vehicle based on features extracted from the images.

6. The system of claim 1, wherein the controller is configured to generate the three-dimensional model by:
classifying the second vehicle into a vehicle category based on characteristics of the identified surface of the second vehicle,
defining a bounding box representing the identified surface of the second, wherein the size of the bounding box is based on the vehicle category of the second vehicle, and
setting the bounding box as the first plane of the three-dimensional model.

7. The system of claim 1, wherein the camera is mounted to a front of the first vehicle.

8. The system of claim 1, wherein the at least one automatic vehicle control operation includes at least one adaptive cruise control and forward collision warning.

9. The system of claim 1, wherein the controller determines turning intention of the second vehicle from rotation of the second vehicle before a vehicle turn of the second vehicle occurs.

10. A method for detecting and avoiding collision with a vehicle, the method comprising:
receiving, at at least one controller, images from at least one camera mounted on a first vehicle;
identifying, by the at least one controller, a surface of a second vehicle located around the first vehicle based on the images by:
detecting motion in the images,
extracting features from the images based on the detected motion,
generating a surface based on the extracted features, and
comparing the surface to a side surface of at least one vehicle model;
generating, by the at least one controller, a three-dimensional model representing the second vehicle, the three-dimensional model including a first plane and a second plane approximately perpendicular to the first plane, wherein the first plane represents the identified surface of the second vehicle;
determining, by the at least one controller, a position of the second vehicle using the model and updated data from the at least one camera after the identified surface of the second vehicle falls at least partially outside of a field-of-view of the at least one camera, and
performing, by the at least one controller, at least one automatic vehicle control operation based on the tracked position of the second vehicle.

11. The method of claim 10, wherein detecting a surface of a second vehicle includes detecting a back surface of a second vehicle.

12. The method of claim 10, wherein detecting a surface of the second vehicle includes detecting a side surface of a second vehicle.

13. The method of claim 10, wherein determining a position of the second vehicle includes
receiving updated images from the at least one camera;
extracting features from the updated images;
determining if the extracted features fit the first plane of the three-dimensional model;
when the extracted features do not fit the first plane of the three-dimensional model, determining if the extracted features fit the second plane of the three-dimensional model; and
when the extracted features fit the second plane of the three-dimensional model, updating the three-dimensional model based on the extracted features.

14. The method of claim 10, wherein generating a three-dimensional model includes
classifying the second vehicle into a vehicle category based on characteristics of the identified surface of the second vehicle,
defining a bounding box representing the identified surface of the second, wherein the size of the bounding box is based on the vehicle category of the second vehicle, and
setting the bounding box as the first plane of the three-dimensional model.

15. The method of claim 10, further comprising transmitting the position of the second vehicle to at least one of an automatic cruise control system and a forward collision warning system.

16. The method of claim 10, wherein the controller determines turning intention of the second vehicle from rotation of the second vehicle before a vehicle turn of the second vehicle occurs.

17. A method for detecting a vehicle, the method comprising:
receiving images from a camera mounted on a moving first vehicle;
detecting a surface of a second vehicle located around the first vehicle based on the images;
generating, by a controller, a three-dimensional model representing the second vehicle, the three-dimensional model including a first plane and a second plane approximately perpendicular to the first plane, wherein the first plane represents the identified surface of the second vehicle;
determining a position of the second vehicle using the model after the identified surface of the second vehicle falls at least partially outside of a field-of-view of the camera, wherein determining the position of the second vehicle includes:
receiving updated images from the camera;

extracting features from the updated images;

determining if the extracted features fit the first plane of the three-dimensional model;

when the extracted features do not fit the first plane of the three-dimensional model, determining if the extracted features fit the second plane of the three-dimensional model; and when the extracted features fit the second plane of the three-dimensional model, updating the three-dimensional model based on the extracted features, and performing at least one automatic vehicle control operation based on the tracked position of the second vehicle.

18. The method of claim 17, wherein the controller determines turning intention of the second vehicle from rotation of the second vehicle before a vehicle turn of the second vehicle occurs.

* * * * *